3,376,304
2-(R-R$_1$-R$_2$-METHYL)-6-R$_3$-6-R$_4$-FULVENES
Richard Joseph Mohrbacher, Fort Washington, and George Ireland Poos, Ambler, Pa., assignors to McNeil Laboratories, Incorporated, a corporation of Pennsylvania
No Drawing. Continuation-in-part of applications Ser. No. 105,288, Apr. 25, 1961, Ser. No. 179,783, Mar. 14, 1962, and Ser. No. 350,596, Mar. 9, 1964. This application Mar. 10, 1966, Ser. No. 533,226
14 Claims. (Cl. 260—288)

ABSTRACT OF THE DISCLOSURE

The compounds are of the class of substituted fulvenes useful as ultraviolet light absorbers.

---

This is a continuation-in-part application of our copending United States application Ser. No. 350,596, filed Mar. 9, 1964, which in turn was a continuation-in-part of our United States application Ser. No. 179,783, filed Mar. 14, 1962, now abandoned, which in turn was a continuation-in-part of United States application Ser. No. 105,288, filed Apr. 25, 1961, all now abandoned.

This invention relates to a new series of organic compounds. More particularly, it concerns 2-(R-R$_1$-R$_2$-methyl)-(R$_6$)-6-R$_3$-6-R$_4$-fulvenes, and the acid addition salts, quaternary ammonium compounds and N-oxide derivatives of the foregoing compounds containing a basic nitrogen; and methods for the preparation thereof. The fulvenes of this invention may be represented as follows:

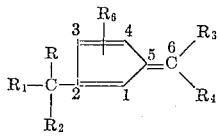

In the above formula, R stands for hydrogen, hydroxy or lower alkoxy, preferably, methoxy; and R$_6$ represents hydrogen, lower alkyl or halo. In the preferred embodiments of this invention, R$_6$, when lower alkyl or halo, is located in the 3-position of the novel fulvenes. Each of R$_1$, R$_2$, R$_3$ and R$_4$ is selected from the group consisting of lower alkyl, heterocyclic aryl, phenyl and substituted phenyl, with the proviso that when R is hydroxy, at least one of said R$_1$, R$_2$, R$_3$ and R$_4$ is other than lower alkyl. When R is hydrogen, the novel compounds may be designated as α-R$_1$-α-[(6-R$_3$-6-R$_4$)-(R$_6$)-2-fulvenyl]-R$_2$-methanes. When R is hydroxy, they may be denoted as α-R$_1$-α-[(6-R$_3$-6-R$_4$)-(R$_6$)-2-fulvenyl]-R$_2$-methanols When R is alkoxy, they may be denoted as α-R$_1$-α-alkoxy-α-[(6-R$_3$-6-R$_4$)-(R$_6$)-2-fulvenyl]-R$_2$-methanes As used herein, substituted phenyl represents a phenyl group having one or more substituents attached to it, such as, for example, a lower alkyl; a hydroxy; an etherified hydroxy group such as lower alkoxy, aryloxy or an aralkoxy radical, e.g., methoxy, ethoxy, isopropoxy, propoxy, allyloxy, phenoxy, benzyloxy, halobenzyloxy, lower alkoxybenzyloxy and the like; and an esterified hydroxy such as a lower alkyl-carbonyl-oxy or aryl-carbonyloxy. Said substituent may also be a nitro group; a halogen, such as chlorine, bromine, fluorine or iodine; an amino group or a substituted amino group, representative examples of which are acylamino, lower alkoxy-carbonylamino, lower alkylamino, lower dialkylamino, amidino, hydrazino or a substituted hydrazino, and sulfonated amino. Furthermore, said substituent may be a mercapto or a substituted mercapto radical of the type exemplified by alkylthio groups such as methylthio, ethylthio, and propylthio and arylthio or aralkylthio groups, e.g., benzylthio and phenylthio. The phenyl radical may, if desired, be haloalkylated, as with a chloromethyl, trifluoromethyl, trifluoroethyl, perfluoroethyl, β-chloroethyl or like substituent; or acylated as with acetyl, propionyl, benzoyl, phenylacetyl, trifluoroacetyl and like acyl groups. In addition, the invention embraces compounds wherein the phenyl radical contains a sulfamyl, benzylthiomethyl or cyano radical. Further, it may contain a carboxy substituent, or a derivative thereof, such as an alkali metal salt or a lower alkyl ester or substituted lower alkyl ester of the carboxy radical, amide, hydrazide and the like. It should be stressed that substituents other than those specifically referred to above may be present in the phenyl component of the compounds of this invention, and, when said phenyl component is polysubstituted, the substituents may be the same or different, said invention being one that contemplates substituents broadly in this portion of the molecule, the only limitation being that imposed by the methods available for introducing and maintaining various types of substituents on the phenyl component.

Heterocyclic aryl groups comprise five- to ten-membered heteroaromatics wherein the hetero atoms are one or more thia, aza or oxa atoms. Included are monocyclic heteroaryls comprising five- to six-members having at least one sulfur, nitrogen or oxygen atom as the heteroatom, and bicyclic heteroaryls having up to ten members and having, as one of the cyclic moieties, a five- to six-membered heteroaromatic ring with at least one sulfur, nitrogen or oxygen atom as the heteroatom. Specific examples of such groups are pyridyl, quinolyl, imidazolyl, pyrazinyl, pyrrolyl, thienyl, furanyl, thiazolyl, thiadiazolyl, pyrazolyl, triazolyl, oxazolyl and pyrimidinyl. Preferably, the heterocyclic aryl group comprises a six-membered heterocyclic with a sole nitrogen as the heteroatom. The azaheterocyclic aryls may be, if so desired, further substituted at the ring carbon and nitrogen atoms. For example, the heterocyclic moiety may be substituted with a lower alkyl, e.g., 6-methyl-2-pyridyl, 4-ethyl-2-pyrimidyl and the like; or, for example, a 2-pyrrolyl moiety may be alkylated to the corresponding N-alkyl-2-pyrrolyl. Further, the carbon-heterocyclic aryl linkage may be at any one of the several carbon atoms of the heterocycle as, for example, at the 2-, 3-, or 4-positions of the pyridyl moiety.

A basic nitrogen in the subject compounds, for example, the nitrogen atom of the azaheterocyclics, provides a basis for obtaining the corresponding acid addition salts, quaternary ammonium compounds and N-oxides of this invention. The acid addition salts may be prepared by reaction with an appropriate acid, as for example, an inorganic acid such as a hydrohalic acid, i.e. hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, picric, fumaric, malic, tartaric, citric, benzoic, cinnamic, mandelic, methanesulfonic, ethanesulfonic, hydroxyethanesulfonic, benzenesulfonic, p-toluenesulfonic, salicylic, p-aminosalicylic, 2-phenoxybenzoic or 2-acetoxybenzoic acid.

Quaternary ammonium compounds may be prepared by reaction of the tertiary bases with alkylating agents, i.e. alkyl, alkenyl or aralkyl halides or esters formed by reacting alkanols with an oxygen-containing acid, such as methyl iodide, ethyl bromide, propyl chloride; allyl bromide; benzyl chloride; or di-lower alkyl sulfates—dimethylsulfate, diethylsulfate; lower alkyl arylsulfonates—methyl p-toluenesulfonate. The quaternizing reaction may be performed in the presence or absence of a solvent, at room temperature or under cooling, at atmospheric pressure or in a closed vessel under pressure. Suitable solvents for this purpose are ethers such as diethylether and tetrahydrofuran, hydrocarbons such as benzene and heptane, ketones such as acetone and butanone, lower alkanols such as ethanol, propanol, or butanol; or organic acid amides such as formamide or dimethylformamide. When lower alkyl halogenides are used as quaternizing agents, diethylether and benzene are the preferred solvents.

The resulting quaternary ammonium compounds may be converted into the corresponding quaternary ammonium hydroxides. This may be accomplished by reaction of the quaternary ammonium halides with silver oxide, by reaction of the sulfates with barium hydroxide, by treating the quaternary salts with an anion exchanger or by electrodialysis. Quaternary ammonium salts may be prepared from the resulting base by reaction with acids such as those mentioned hereinabove for the preparation of the acid addition salts or, if desired, with a mono-lower alkyl sulfate such as methylsulfate or ethylsulfate. The quaternary ammonium compound may also be converted into another quaternary salt directly without conversion into the quaternary ammonium hydroxide. Thus, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

To obtain the amine oxides of this invention, oxidation of the azaheterocyclic aryl component of the starting $R_1$—CO—$R_2$ and $R_3$—CO—$R_4$ ketones hereinafter described is advantageously accomplished with oxidizing agents such as aqueous hydrogen peroxide in glacial acetic acid. For example, a 2-pyridyl group in the $R_1$, $R_2$, $R_3$ or $R_4$ positions may be oxidized to the corresponding 2-pyridyl-1-oxide by treatment with 30% aqueous hydrogen peroxide at 70–80° C. in glacial acetic acid. The resulting ketone N-oxide may then be used in the reaction schemes hereinafter described.

As used herein, lower alkyl and lower alkoxy may be straight or branch chained and have from 1 to 7 carbon atoms, such as, for example, methyl, ethyl, propyl, isopropyl, butyl, isobutyl, tertiary-butyl, pentyl, hexyl, heptyl and the like and the corresponding methoxy, ethoxy, propoxy, isopropoxy, butoxy, etc.; cycloalkyl stands for a cyclic alkyl of from 3 to 8 carbon atoms; halo stands for chloro, fluoro, bromo, and iodo; and aryl is preferably phenyl or substituted phenyl.

The compounds of this invention absorb ultraviolet (U.V.) light and are useful as U.V.-screening materials. Because of their solubility in organic materials generally, they may be used as U.V.-absorbers in plastics and resins, such as polystyrene, polyethylene, polypropylene, polyacrylics (methacrylate resins, polyacrylamides, polyacrylonitrile fibers and the like), polyamide fibers (e.g. nylon) and polyester fibers. In the latter use, the inclusion of 0.01 to 5% of the absorber, based on the polymer weight, is usually sufficient to render protection against U.V. light, such as in plastic films or light filters. The absorber may be incorporated in the mixture of monomers before polymerization to form the polymer or it may be incorporated in the polymer at any stage during its handling, as by milling into the polymer together with other compounding ingredients or during the spinning of polymers into fibers, etc.

It is to be understood that the compounds of this invention may be obtained in one or both of the two possible geometrically stereoisomeric configurations, depending upon the reaction conditions or starting materials employed. The novel compounds, as generically described and claimed, are intended to embrace both configurations. Accordingly, the examples included herein are to be understood as illustrative of discrete species, not as limitations upon the scope of the invention or as restrictive exemplifications of a specific configuration.

The 2-(R-$R_1$-$R_2$-methyl)-($R_6$)-6-$R_3$-6-$R_4$-fulvenes may be prepared in several ways. For example, the α-$R_1$-α-[(6-$R_1$-6-$R_2$)-($R_6$)-2-fulvenyl]-$R_2$-methanols are obtained by condensation of a ketone of the formula, $R_1$—CO—$R_2$, e.g., phenyl-2-pyridyl ketone, with cyclopentadiene or an $R_6$-substituted cyclopentadiene in the presence of a basic catalyst, such as an alkali metal hydroxide, alcoholate, hydride, or amide; a tertiary amine; a basic ion-exchange resin or a quaternary ammonium hydroxide, and the like, in a suitable organic solvent. Examples of suitable basic catalysts include sodium alkoxides, potassium alkoxides, triethylamine and trimethylbenzyl ammonium hydroxide. Among the organic solvents that are operable herein are aromatic hydrocarbons, such as, for example, benzene, toluene, xylene and the like; lower aliphatic alcohols, such as, for example, methanol, ethanol, 2-propanol, tertiary-butanol and the like; mixture of said aromatic hydrocarbons and said aliphatic alcohols; tetrahydrofuran, 1,2-dimethoxyethane, pyridine, and the like. Following completion of the condensation reaction, the desired α-$R_1$-α-[(6-$R_1$-6-$R_2$)-2-fulvenyl]-$R_2$-methanol is obtained by conventional isolation techniques, e.g., filtration, dilution with water followed by organic solvent extraction, chromatography, etc. A 6-$R_1$-6-$R_2$-fulvene product, which may also be formed during the condensation reaction, may also be isolated by conventional techniques. In the condensation reaction, an $R_6$-substituted cyclopentadiene may be utilized in place of the cyclopentadiene, in which case, the final products will also be appropriately $R_6$-substituted.

In some instances, the condensation reaction between cyclopentadiene or an $R_6$-substituted cyclopentadiene and an $R_1$—CO—$R_2$ compound in the presence of an alkali metal alkoxide in an alcoholic solvent produces the corresponding cyclopentadienyl $R_1$-$R_2$-methanol or the alkali metal salt thereof. Replacement of the alcoholic solvent with a nonhydroxylic solvent, e.g., monoglyme, ether, tetrahydrofuran, etc., and addition of a strong base such as an alkali metal hydride or amide, together with the addition of a ketone of the formula $R_3$—CO—$R_4$, results in the corresponding α-$R_1$-α-[(6-$R_3$-6-$R_4$)-($R_6$)-2-fulvenyl]-$R_2$-methanols.

Another method of obtaining α-$R_1$-α-[(6-$R_3$-6-$R_4$)-($R_6$)-2-fulvenyl]-$R_2$-methanols is by the interaction of a cyclopentadienyl Grignard reagent, e.g., a cyclopentadienyl magnesium halide such as cyclopentadienyl magnesium bromide, with an $R_1$—CO—$R_2$ compound in a nonhydroxylic solvent, preferably at reduced temperatures, to produce the corresponding cyclopentadienyl $R_1$-$R_2$-methanol which, in turn, may be treated with an

$$R_3—CO—R_4$$

compound in the presence of a strong base to give the desired fulvenyl methanol. Some α-$R_1$-α-[(6-$R_1$-6-$R_2$)-($R_6$)-2-fulvenyl]-$R_2$-methanol, which may also be formed in conjunction with said cyclopentadienyl $R_1$-$R_2$-methanol, may be separated from the latter by conventional techniques, e.g., by fractional crystallization.

The α-$R_1$-α-[(6-$R_3$-6-$R_4$)-($R_6$)-2-fulvenyl]-$R_2$-methanes are obtained by treating a cyclopentadienyl metal derivative, for example, cyclopentadienyl sodium with an alkylating agent having the formula, $$CH(R_1)(R_2)—X$$

wherein X is halo, e.g., benzhydryl chloride, α-methylbenzyl bromide, α-(2-pyridyl)-benzyl chloride and the like, in an organic solvent such as hexane, 1,2-dimethoxyethane, benzene, etc., to give the corresponding CH($R_1$)($R_2$)-substituted cyclopentadiene which is then treated with a ketone of the formula $R_3$—CO—$R_4$ in the presence of a basic catalyst in a suitable organic solvent to give the desired fulvenyl methane product. In place of cyclopentadienyl sodium, a cyclopentadienyl Grignard reagent, e.g., a cyclopentadienyl magnesium halide, may also be used. In addition, the CH($R_1$)($R_2$)-substituted cyclopentadiene may be prepared by reduction of a 6-$R_1$-6-$R_2$-fulvene, for example with complex metal hydrides, such as lithium aluminum hydride, in an inert anhydrous organic solvent, such as diethyl ether, tetrahydrofuran, the dimethyl ether of diethylene glycol (diglyme), etc.

The α-$R_1$-α-[(6-$R_3$-6-$R_4$)-($R_6$)-2-ful- 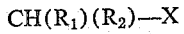

venyl]-$R_2$-methanes may be converted into the corresponding $\alpha$-$R_1$-$\alpha$-[(6-$R_3$-6-$R_4$)-($R_6$)-2-fulvenyl]-$R_2$-methanols in several ways. For example $\alpha$-$R_1$-$\alpha$-[(6-$R_3$-6-$R_4$)($R_6$)-2-fulvenyl]-$R_2$-methane may be treated with a free radical halogenating agent such as N-bromosuccinimide in a halocarbon solvent, such as carbon tetrachloride or chloroform, to give the corresponding $\alpha$-$R_1$-$\alpha$-$R_2$-[(6-$R_3$-6-$R_4$)-($R_6$)-2-fulvenyl]halomethane which, upon hydrolysis, e.g., by water in acetone or dilute alkali metal hydroxides in aqueous alcohol, yields the corresponding $\alpha$-$R_1$-$\alpha$-[(6-$R_3$-6-$R_4$)-($R_6$)-2-fulvenyl]-$R_2$-methanol.

Alternatively, $\alpha$ - $R_1$ - $\alpha$ - [(6 - $R_3$ - 6 - $R_4$) - ($R_6$) - 2-fulvenyl]-$R_2$-methane may be converted to its hexachloroantimonate salt by addition of an antimony pentachloride solution in carbon disulfide to a solution of the fulvenyl methane in carbon disulfide. After about one hour at room temperature, the solvent is evaporated off and water and chloroform are added and the mixture stirred. The resulting fulvenyl methanol is found in the chloroform layer and may be isolated by conventional techniques.

The fulvenyl methanols may also be obtained by hydroxylation of an acetic acid solution of an $\alpha$-$R_1$-$\alpha$-[(6-$R_3$-6-$R_4$)-($R_6$)-2-fulvenyl]-$R_2$-methane with chromium trioxide in acetic acid at room temperature for 4–24 hours.

Still another method of synthesizing $\alpha$-$R_1$-$\alpha$-[(6-$R_3$-6-$R_4$)-($R_6$)2-fulvenyl]-$R_2$-methanols consists in the condensation of a 6-$R_3$-6-$R_4$-fulvene with a $R_1$—CO—$R_2$ compound in the presence of phosphorous oxychloride, concentrated sulfuric acid, or a Lewis acid such as boron trifluoride, etc., in an appropriate solvent such as carbon disulfide, ether, monoglyme and the like.

The $\alpha$-R-$\alpha$-$R_1$-$\alpha$-[(6-$R_3$-6-$R_4$)-($R_6$) - 2 - fulvenyl] - $R_2$-methanes, wherein R is lower alkoxy, may be obtained from the corresponding $\alpha$-$R_1$-$\alpha$-[(6-$R_3$-6-$R_4$)-($R_6$)-2-fulvenyl]-$R_2$-methanols. Such may be advantageously accomplished by transforming the hydroxylic function of the fulvenyl methanols into an alkali metal salt e.g., by treatment with an alkali metal or alkali metal hydride in a suitable monhydroxylic organic solvent such as monoglyme. The resulting alkali metal salt is then alkylated, for example, by treatment with an appropriate alkylating agent such as a lower alkyl halide, e.g., methyl iodide, in a suitable solvent, thereby converting the alkali metal salt into the desired ether.

The following examples are intended to illustrate, but not to limit, the scope of the present invention.

EXAMPLE I

To a cold (ice bath) solution of sodium ethoxide which is prepared by dissolving 0.8 part by weight of sodium metal in 380 parts by volume of absolute ethanol is added 64 parts by weight of phenyl-2-pyridylketone and then 40 parts by weight of freshly distilled cyclopentadiene over twenty minutes. The reaction solution is kept under nitrogen and darkens rapidly during the addition. It is stirred at ice bath temperature for two hours after which crystals of product begin to appear. After the mixture is stirred for fifteen hours under nitrogen at ice bath temperature, the crystalline product is separated by filtration. The filtrate contains 6-phenyl-6-(2-pyridyl)-fulvene. The solid product amounts to 49 parts by weight of orange crystals melting at 144° C. to 168° C. One recrystallization from absolute ethanol gives pure $\alpha$-phenyl-$\alpha$-[6-phenyl-6-(2-pyridyl)-2-fulvenyl]-2-pyridinemethanol as orange prisms melting at 164° C. to 170° C.

EXAMPLE II

To a warm (35° C.) solution of sodium ethoxide which is prepared by dissolving 2.3 parts by weight of sodium metal in 150 parts by volume of absolute ethanol is added 18.3 parts by weight of phenyl-4-pyridylketone and then 11.5 parts by weight of freshly distilled cyclopentadiene over twenty minutes. The reaction solution is kept under nitrogen and darkens rapidly during the addition. It is stirred at ice bath temperature for two hours after which crystals of product begin to appear. After the mixture is stirred for fifteen hours under nitrogen at ice bath temperature, the crystalline product is separated by filtration. The filtrate contains 6-phenyl-6-(4-pyridyl)-fulvene. The solid product amounts to 12.8 parts by weight of orange crystals melting at 192° C. to 195° C. Two recrystallizations (from absolute ethanol) give pure $\alpha$-phenyl - $\alpha$ - [6 - phenyl - 6 - (4 - pyridyl) - 2 - fulvenyl]-4-pyridinemethanol as orange prisms melting at 210° C. to 211° C.

EXAMPLE III

To a cold (ice bath) solution of sodium ethoxide which is prepared by dissolving 0.8 part by weight of sodium metal in 380 parts by volume of absolute ethanol is added 64 parts by weight of phenyl-3-pyridylketone and then 40 parts by weight of freshly distilled cyclopentadiene over twenty minutes. The reaction solution is kept under nitrogen and darkens rapidly during the addition. After the mixture is stirred for fifteen hours under nitrogen at ice bath temperature, the product is separated from the solution. The solution contains 6-phenyl-6-(3-pyridyl) fulvene. The product consists of $\alpha$-phenyl-$\alpha$-[-phenyl-6-(3-pyridyl)-2-fulvenyl]-3-pyridinemethanol, melting at 170–175° C.

EXAMPLE IV

To a cold (ice bath) solution of sodium ethoxide which is prepared by dissolving 0.3 part by weight of sodium metal in 100 parts by volume of absolute ethanol is added 25 parts by weight of 2,2-dipyridyl ketone and then 15.7 parts by weight of freshly distilled cyclopentadiene over 20 minutes. The reaction solution is kept under nitrogen and darkens rapidly during the addition. It is stirred at ice bath temperature for 2 hours after which crystals of product begin to appear. After the mixture is stirred for 15 hours at ice bath temperature, the crystalline produce is separated by filtration. The filtrate contatins 6,6-(di-2-pyridyl)fulvene. The solid product amounts to 15 parts by weight of orange crystals melting at 141–144° C. One recrystallization from ethylacetate gives pure di-2-pyridyl-(6,6-di-2-pyridyl-2-fulvenyl)methanol as orange prisms melting at 147° C. to 148° C.

EXAMPLE V

To 400 ml. of absolute ethanol is added 1.2 g. of sodium metal. After dissolution of the sodium is complete, the flask is cooled to 0–5° C. in an ice bath, 3.3 g. (0.05 mole) of freshly distilled cyclopentadiene is added in one portion with stirring. To this solution is added 21.75 g. (0.1 mole) of $\alpha$-p-chlorobenzoylpyridine. The resultant slurry is stirred overnight and allowed to warm to room temperature. The resulting clear deep-red solution is evaporated to near-dryness under reduced pressure. The viscous dark syrup is taken up in ether (600 ml.) and washed with water (600 ml.). The water layer is extracted 3 times with 250 ml. portions of ether. The combined ether extracts are dried over magnesium sulfate and the ether is removed in vacuo. The resulting orange amorphous solid, $\alpha$ - p - chlorophenyl-$\alpha$-[6-chlorophenyl-6-(2-pyridyl) - 2 - fulvenyl] - 2 - pyridinemethanol, melted (gradual softening) at 90–108° C.

EXAMPLE VI

To a cold (0–5° C.) stirred solution of 0.345 g. of sodium in 300 ml. of absolute ethanol is added 1.0 g. (0.015 mole) of freshly distilled cyclopentadiene, followed by 7.0 g. (0.03 mole) of 2-benzoylquinoline. The resultant slurry is stirred overnight at 0° C. The reaction mixture is allowed to warm to room temperature with continued stirring. At the end of 3 hours, the reaction mixture becomes homogeneous and acquires a red color. After 3 additional hours, 0.25 g. (0.004 mole) of additional cyclopentadiene is added and the reaction is allowed to proceed for an additional 66 hours at room temperature. A red-orange solid separates from the reaction mixture and is collected by suction filtration and dried in air; M.P. 203.5–2–4.5° C. (dec.). Two recrystallizations from benzene-cyclohexane yields pure α-phenyl-α-[6-phenyl-6-(2-quinolyl) - 2 - fulvenyl] - 2 - quinolinemethanol; M.P. 207–207.5° C. (dec.);

$\lambda_{max.}^{CH_3CN}$ 338 mμ (ε=22,300), 321 mμ (ε=21,600), 302 mμ (ε=19,700)

EXAMPLE VII

To a solution of 2.1 g. (0.03 mole) of dry sodium ethoxide in 400 ml. of pyridine is added 54 g. (0.3 mole) of benzophenone. To this cooled (ice bath) solution is added 20 g. (0.3 mole) of cyclopentadiene with stirring and the resulting red-brown solution is stirred at 25° C. for 24 hours. It is then concentrated under vacuum, diluted with ether and washed with dilute hydrochloric acid and water, dried over anhydrous magnesium sulfate and concentrated under vacuum. The residual red-brown oil is chromatographed on neutral alumina. After elution of diphenylfulvene and benzophenone with 50% ether in petroleum ether (30–60°), the desired product is eluted with 50% ether in chloroform yielding a red oil which crystallized. Recrystallization from cyclohexane yields α-(6,6-diphenyl-2-fulvenyl)benzhydrol as orange crystals, M.P. 129–130.5° C.

*Analysis.*—Calcd. for $C_{31}H_{24}O$: C, 90.26; H, 5.86%. Found: C, 89.96; H, 5.99%.

EXAMPLE VIII

A solution of 10 g. (0.043 mole) of benzhydrylcyclopentadiene, 7.16 g. (0.039 mole) of 2-benzoylpyridine and 0.0043 mole of sodium ethoxide in 100 ml. of ethanol is heated to reflux over 7 minutes and refluxed for 30 minutes. The deep red solution is poured onto ice water containing 90 ml. of dilute hydrochloric acid. The resulting weakly acidic mixture deposits a red gum. The supernatant solution is decanted and extracted with ether-benzene solution. The organic layer is then extracted with water until the water wash becomes neutral. The organic layer is combined with an ether-benzene solution of the red gum and dried over magnesium sulfate. After removal of the drying agent, the solution is evaporated to dryness to give 15 g. of oily product. An 8.3 g. sample of this oil is extracted 3 times with 250 ml. portions of boiling petroleum ether (30–60° C.). The combined extracts are cooled at 0° C. to give clusters of orange needles which are collected by filtration, M.P. 134–136° C., and purified by recrystallization from hexane to give 2-benzhydryl - 6 - phenyl - 6 - (2 - pyridyl)fulvene, orange crystals; M.P. 135–136° C.

*Analysis.*—Calcd. for $C_{30}H_{23}N$: C, 90.64; H, 5.83; N, 3.52%. Found: C, 90.49; H, 5.85; N, 3.77%.

EXAMPLE IX

To a sodium ethoxide solution, prepared from 2.4 g. of sodium and 15 ml. of ethanol are added 36.6 g. of 2-benzoylpyridine (0.2 mole) and 16 g. (0.2 mole) of methylcyclopentadiene. The reaction mixture is allowed to stand under refrigeration at 0° C. for 3 days. The precipitated orange solid is filtered off, M.P. 139–145° C. Fractional crystallization from 95% ethanol yields 3.2 g. of α - phenyl - α - [6 - phenyl-6-(2-pyridyl)-3-methyl-2-fulvenyl] - 2 - pyridinemethanol as orange crystals; M.P. 167–168° C. (fulvene isomer A).

*Analysis.*—Calcd. for $C_{30}H_{24}N_2O$: C, 84.08; H, 5.65; N, 6.54%. Found: C, 84.20; H, 5.70; N, 6.41%.

Cooling of the mother liquors of "fulvene isomer A" followed by recrystallization of the resulting precipitate twice with ethanol and once with hexane yields 4.6 g. of α - phenyl - α - [6 - phenyl - 6 - (2 - pyridyl) - 3 - methyl-2 - fulvenyl] - 2 - pyridinemethanol as orange crystals; M.P. 147–148° C. (fulvene isomer B).

*Analysis.*—Calcd. for $C_{30}H_{24}N_2O$: C, 84.08; H, 5.65; N, 6.54%. Found: C, 84.11; H, 5.71; N, 6.48%.

EXAMPLE X

An 18.3 g. (0.1 mole) sample of 2-benzoylpyridine in 60 ml. glacial acetic acid is reacted with 14.7 ml. of 30% hydrogen peroxide by heating at 60–80° C. with stirring for 12 hours. The reaction is then allowed to stir at room temperature for 16 hours. The solution is distilled under reduced pressure to remove most of the solvent. The residual oil is dissolved in chloroform and washed with potassium carbonate solution, dried over magnesium sulfate and solvent evaporated. The residue crystallizes on cooling and is recrystallized from ethyl acetate-ether to give the white crystalline 2-benzoylpyridine-N-oxide; M.P. 99–100° C.

*Analysis.*—Calcd. for $C_{12}H_9NO_2$: C, 72.35; H, 4.55; N, 7.03%. Found: C, 72.18; H, 4.67; N, 7.31%.

EXAMPLE XI

To a sodium ethoxide solution prepared from 0.63 g. (0.27 g.-atom) of sodium and 60 ml. of ethanol are added 2.5 g. (0.037 mole) of cyclopentadiene and 5.0 g. (0.025 mole) of 2-benzoylpyridine-N-oxide. The resulting solution is allowed to stand under nitrogen at 0° C. for 65 hours. The resulting yellow solid is filtered and recrystallized from aqueous ethanol to give α-phenyl-α-[6-phenyl-6-(2-pyridyl-N-oxide)-2-fulvenyl]-2-pyridine - N - oxide methanol as yellow crystals; M.P. 223° C. to 224° C.

EXAMPLE XII

To a sodium ethoxide solution, prepared by dissolving 0.2 g. of sodium in 350 ml. of absolute ethanol, is added 16.2 g. (0.088 mole) of di-4-pyridyl ketone. Freshly cracked cyclopentadiene(8 g., 0.12 mole) is added rapidly to the warm suspension of undissolved ketone. A red color formed immediately and the reaction is cooled in an ice bath. After stirring in the cold for 19 hours, the orange crystals are removed by filtration. Two recrystallizations from ethyl acetate-methanol (1:3) yields di-4-pyridyl - (6,6-di-4-pyridyl-2-fulvenyl)methanol, orange crystals, M.P. 236–238° C.;

$\lambda_{max.}^{CH_3OH}$ 238 (14,900), 259 (12,600), 266 (12,300), and 318 mμ (24,400)

EXAMPLE XIII

A 1.0 g. sample of α-phenyl-α-[6-phenyl-6-(2-pyridyl)-2-fulvenyl]-2-pyridinemethanol and 2 g. of methyl iodide are dissolved in 125 ml. of ether:acetone (6:1) solution. The flask is stoppered and allowed to sit for 11 days at room temperature at which time fine crystals have deposited on the sides of the flask. The contents of the flask are allowed to evaporate to less volume at room temperature. The product, α - phenyl-α-[6-phenyl-6-(2-pyridyl)-2-fulvenyl]-2-pyridinemethanol dimethiodide, is separated by decantation and after drying weighed 0.6 g.

EXAMPLE XIV

To 50 ml. of 0.5 N hydrochloric acid is added 4.15 g. of α-phenyl-α-[6-phenyl-6-(2-pyridyl)-2-fulvenyl]-2-pyridinemethanol. The mixture is stirred at room temperature until all of the solid has dissolved to give a solution of α-phenyl-α-[6-phenyl-6-(2-pyridyl)-2-fulvenyl] - 2 - pyridinemethanol hydrochloride.

EXAMPLE XV

To a solution of 0.0015 mole of sodium ethoxide (from 0.34 g. of sodium) and 12.2 g. (0.06 mole) of di-(6-methyl-2-pyridyl)ketone in 40 ml. of absolute ethanol at 5° C. under nitrogen is added dropwise 2 g. (0.03 mole) of freshly distilled cyclopentadiene over a twenty-minute period. The resultant slurry is stirred at room temperature for 5 hours until all the solid dissolves. The resulting dark solution is kept at 15° C. for 60 hours.

The ethanol is removed in vacuo and the residual red oil is dissolved in chloroform. The chloroform solution is washed four times with water, once with brine, and dried over magnesium sulfate. Removal of the chloroform gives a red oil which is triturated with benzene-cyclohexane to give red crystalline α,α,α',α'-tetra(6-methyl-2-pyridyl)-2-fulvenylmethanol, melting at 113.5–116° C.

EXAMPLE XVI

To a boiling suspension of 5.35 g. of sodium hydride (54% in mineral oil, 0.12 mole) previously washed with anhydrous ether, in 100 ml. of anhydrous monoglyme is added dropwise over 40 minutes a solution of 25 g. (0.06 mole) of α-phenyl-α-[6-phenyl-6-(2-pyridyl)-2-fulvenyl]-2-pyridinemethanol in 400 ml. of anhydrous monoglyme. After 1260 ml. (84% of theoretical) of hydrogen has evolved, an additional 0.67 g. of 54% sodium hydride is added. The mixture is cooled and allowed to stand at room temperature overnight and then treated with 8.52 g. (0.06 mole) of methyl iodide in 15 ml. of monoglyme. After 2 hrs. at room temperature, the mixture is refluxed for 30 minutes, cooled and then treated with 15 ml. of absolute ethanol. Addition of water is followed by evaporation to an oily sludge which is partitioned between water and chloroform. The chloroform layer is washed with water and with saturated brine. After drying, the solution is evaporated in vacuo to leave a tar which is triturated with hot ethyl acetate until most of the tar is dissolved. Cooling of the supernatant gives orange crystals which are recrystallized twice from ethyl acetate to give crystalline α-phenyl-α-[6-phenyl-6-(2-pyridyl)-2-fulvenyl]-2-pyridyl-methyl methyl ether, M.P. 178–180° C.

*Analysis.*—Calcd. for $C_{30}H_{24}N_2O$: N, 6.54. Found: N, 6.51, 6.69.

EXAMPLE XVII

To an ethereal solution of ethyl magnesium bromide prepared from 4.86 g. (0.2 g.-atom) of magnesium and 25 g. (0.229 mole) of ethyl bromide is added 125 ml. of dry benzene. Ether is distilled until the boiling point of the mixture reaches 60–63° C. Then 13.2 g. (0.2 mole) of freshly distilled cyclopentadiene is added and the mixture is refluxed for six hours. The resultant cyclopentadienyl magnesium bromide solution is cooled under an atmosphere of dry nitrogen to below 0° C. and 36.4 g. (0.2 mole) of benzophenone in 100 ml. of ether is added with stirring. After stirring for an additional 30 min., the mixture is hydrolyzed with excess ice water containing 12.0 g. (0.2 mole) of glacial acetic acid. The organic phase is separated and the aqueous phase extracted with three 150–200 ml. portions of ether. The combined extracts are washed with dilute sodium bicarbonate solution and dried over sodium sulfate. Most of the solvent is evaporated in vacuo and the resultant semi-crystalline mass crystallizes upon addition of hexane. The solid is filtered, washed with pet ether, and dried to yield α-cyclopentadienyl-α-phenylbenzyl alcohol; M.P. 119–123° C.

A solution of 12.4 g. (0.05 mole) of α-cyclopentadienyl-α-phenylbenzyl alcohol and 9.15 g. of 2-benzoylpyridine in 60 ml. of absolute ethanol is cooled to about 3° C. in an ice water bath. A solution of 0.46 g. (0.02 g.-atom) of sodium in 20 ml. of absolute ethanol is added and the mixture is stirred at ice-bath temperatures for about three hours. The resulting orange solid is collected and washed with ethanol. Recrystallization from acetone-methanol gives the product, α,6,6-triphenyl-α-(2-pyridyl)-2-fulvenemethanol, M.P. 171–173° C.

EXAMPLE XVIII

To a 120 ml. (50–50 ethanol-monoglyme) solution of 4.54 g. (0.02 mole) of p-nitrobenzophenone containing 0.02 mole of sodium ethoxide is added cyclopentadiene (1.2 g.) over a period of 15 min. at 4° C. After 5 hours, the reaction mixture is worked up by concentration, dilution with water and extraction with chloroform. Concentration of the chloroform extracts gives an oil which is chromatographed on neutral alumina. Elution with ether separates 1.8 g. (32% yield) of 6-phenyl-6-(p-nitrophenyl)-fulvene. Elution with 70:30 ether-chloroform separates the fraction containing 3-fulvenyl methanol. This latter portion is rechromatographed to give 0.75 g. (12% yield) of homogeneous α-(p-nitrophenyl)-α-[6-phenyl-6-(p-nitrophenyl)-2-fulvenyl]-benzyl alcohol.

EXAMPLE XIX

To a 25 ml. solution of 18% cyclopentadienyl sodium (0.05 mole) in tetrahydrofuran is added 2-acetylpyridine (6.0 g., 0.05 mole) dissolved in 50 ml. of dry monoglyme. The resultant solution is allowed to stand at 5° C. for 21 hours. A 15 ml. portion is withdrawn and worked up by dilution with water and extraction with ether. Drying of the ethereal layer and removal of the solvent leaves an oil which is chromatographed on 40 g. of neutral alumina. An elution of the column with 20% ether in petroleum ether is discarded. A second elution with pure ether, followed by evaporation of the ether, gives α-methyl-α-[6-methyl-6-(2-pyridyl)-2-fulvenyl]-2-pyridinemethanol as a red oil.

EXAMPLE XX

To a solution of 8.16 g. (0.03 mole) of m,m'-dinitrobenzophenone in a mixture of ethanol and monoglyme (55 ml. of a 50–50 solution) is added, at 3° C., a solution of 0.015 mole of cyclopentadienyl sodium in ethanol (10 ml.) over a period of one hour. After the addition is complete, the mixture is stirred at 3° C. for another 2 hours, and then worked up by dilution with water and extracted with chloroform. The crude product is chromatographed on neutral alumina. Elution with ether separates a small amount of residual starting material, m,m'-dinitrobenzophenone. A second elution with 20% chloroform in ether is discarded. A third elution with pure chloroform followed by evaporation of the chloroform, gives as an oily product, α,α,6,6-tetra(m-nitrophenyl)-2-fulvenemethanol, the structure of which is confirmed by infrared, ultraviolet and nuclear magnetic resonance spectral analysis.

EXAMPLE XXI

α-Cyclopentadienyl-α-phenylbenzyl alcohol (2.48 g., 0.01 mole) and di-2-pyridyl ketone (1.84 g., 0.01 mole) are dissolved in 150 ml. of absolute ethanol. The resulting solution is cooled to 5° C. and 20 ml. of absolute ethanol containing 0.23 g. (0.01 atom) of dissolved sodium are added. After stirring at 5° C. for about two hours, the temperature is allowed to rise to room temperature. The resulting orange solid is filtered off. Fractional recrystallization from acetone-methanol gives the pure product, α,α-di-(2-pyridyl)-6,6-diphenyl-2-fulvenemethanol, M.P. 146.5–147.5 C.

EXAMPLE XXII

To a solution of 0.026 mole of sodium ethoxide (from 0.6 g. of sodium) and 9.2 g. (0.05 mole) of 2-pyridyl-4-pyridyl ketone in 25 ml. of absolute ethanol at 5° C. under nitrogen is added dropwise 1.72 g. (0.026 mole) of freshly distilled cyclopentadiene over a 30 minute period. The mixture is stirred under nitrogen for 3 hours at 10–13° C. and then for 24 hours at room temperature. The orange crystalline product is collected by filtration and dried to give crude α-(2-pyridyl)-α-[6-(2-pyridyl)-6-(4-pyridyl)-2-fulvenyl]-4-pyridinemethanol. Three recrystallizations from ethyl acetate gives the pure product, M.P. 133–145° C.

What is claimed is:

1. A member selected from the group consisting of 2-($R$-$R_1$-$R_2$-methyl)-($R_6$)-6-$R_3$-6-$R_4$-fulvene, wherein $R$ is selected from the group consisting of hydrogen, hydroxy and methoxy; $R_1$, $R_2$, $R_3$ and $R_4$ are each selected from the group consisting of lower alkyl, azaheterocyclic aryl, phenyl, halophenyl and nitrophenyl, said azaheterocyclic aryl being a member selected from the group consisting of pyridyl, methyl-pyridyl and quinolyl; and $R_6$ is selected from the group consisting of hydrogen and lower alkyl; with the proviso that, when R is hydroxy, at least one of said $R_1$, $R_2$, $R_3$ and $R_4$ is other than lower alkyl; and, when at least one of said $R_1$, $R_2$, $R_3$ and $R_4$ is said azaheterocyclic aryl, the amine oxides thereof.

2. The compound of claim 1 wherein R is hydroxy.
3. The compound according to claim 1 which is α-phenyl-α-[6-phenyl-6-(pyridyl)-2-fulvenyl]pyridinemethanol.
4. The compound according to claim 1 which α-phenyl-α - [6-phenyl-6-(2-pyridyl)-2-fulvenyl]-2-pyridinemethanol.
5. The compound according to claim 1 which is di-pyridyl-(6,6-di-pyridyl-2-fulvenyl)methanol.
6. The compound according to claim 1 which is di-2-pyridyl-(6,6-di-2-pyridyl-2-fulvenyl)methanol.
7. The compound according to claim 1 which is α-p-chlorophenyl - α - [6-p-chlorophenyl-6-(2-pyridyl)-2-fulvenyl]-2-pyridinemethanol.
8. The compound according to claim 1 which is α-phenyl - α - [6-phenyl-6-(2-quinolyl)-2-fulvenyl]-2-quinolinemethanol.
9. The compound according to claim 1 which is α-(6,6-diphenyl-2-fulvenyl)benzohydrol.
10. The compound according to claim 1 which is 2-benzhydryl-6-phenyl-6-(2-pyridyl)fulvene.
11. The compound according to claim 1 which is α-phenyl - α - [6-phenyl-6-(2-pyridyl)-3-(methyl)-2-fulvenyl]-2-pyridinemethanol.
12. The compound according to claim 1 which is α,α,6,6-tetra-(m-nitrophenyl)-2-fulvenemethanol.
13. The compound according to claim 1 which is α-phenyl - α - [6-phenyl-6-(2-pyridyl)-2-fulvenyl]-2-pyridylmethyl methyl ether.
14. The compound according to claim 1 which is α-2 - pyridyl - α-[6,6-diphenyl-2-fulvenyl]-2-pyridinemethanol.

References Cited

Burger: Medicinal Chemistry, 2nd edition, Interscience, 1960, p. 42–3.

NICHOLAS S. RIZZO, *Primary Examiner.*

ALEX MAZEL, *Examiner.*

D. G. DAUS. *Assistant Examiner.*

UNITED STATES PATENT OFFICE
CERTIFICATE OF CORRECTION

Patent No. 3,376,304            April 2, 1968

Richard Joseph Mohrbacher et al.

It is certified that error appears in the above identified patent and that said Letters Patent are hereby corrected as shown below:

Column 6, line 24, for "[phenyl-6-(3-pyridyl)-2-fulvenyl]" read -- [6-phenyl-6-(3-pyridyl)-2-fulvenyl] --; lines 39 and 40, for "produce" read -- product --; lines 61 and 62, for "[6-chlorophenyl-6-(2-pyridyl)-2-fulvenyl]" read -- [6-p-chlorophenyl-6-(2-pyridyl)-2-fulvenyl] --; column 10, line 56, for "146.5-147.5C. -- 146.5-147.5° C. --.

Signed and sealed this 22nd day of July 1969.

(SEAL)
Attest:

Edward M. Fletcher, Jr.            WILLIAM E. SCHUYLER, JR.
Attesting Officer            Commissioner of Patents